United States Patent
Cheng et al.

(10) Patent No.: US 12,450,206 B2
(45) Date of Patent: *Oct. 21, 2025

(54) METHODS AND SYSTEMS FOR PROVIDING DATABASE DEVELOPMENT RECOMMENDATIONS BASED ON MULTI-MODAL CORRELATIONS DETECTED THROUGH ARTIFICIAL INTELLIGENCE

(71) Applicant: Capital One Services, LLC, McLean, VA (US)

(72) Inventors: Steve Cheng, Exton, PA (US); Narender Pashikant, Ashburn, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/738,743

(22) Filed: Jun. 10, 2024

(65) Prior Publication Data

US 2024/0330250 A1    Oct. 3, 2024

Related U.S. Application Data

(63) Continuation of application No. 17/590,471, filed on Feb. 1, 2022, now Pat. No. 12,007,958.

(51) Int. Cl.
*G06F 16/21* (2019.01)
*G06F 11/34* (2006.01)
*G06F 16/2458* (2019.01)

(52) U.S. Cl.
CPC ........ *G06F 16/211* (2019.01); *G06F 11/3442* (2013.01); *G06F 11/3457* (2013.01); *G06F 16/2462* (2019.01)

(58) Field of Classification Search
CPC .............. G06F 16/211; G06F 11/3442; G06F 11/3457; G06F 16/2462
USPC ........................................... 707/803
See application file for complete search history.

(56) References Cited

U.S. PATENT DOCUMENTS

2020/0356462 A1*  11/2020  Anand ............... G06F 11/3495
2021/0286786 A1*  9/2021  Zhang ...................... G06N 3/08

OTHER PUBLICATIONS

Pctus2023061509 written opinion (Year: 2023).*

* cited by examiner

*Primary Examiner* — Michael Pham
(74) *Attorney, Agent, or Firm* — Foley & Lardner LLP

(57) ABSTRACT

A method or system for generating recommendations based on detected correlations of static and dynamic data. For example, the system generates feature inputs for the machine learning model that is based on labeled static data as well as dynamic data indicating current usage. Notably, the dynamic data is not retrieved from a data store of known training data, but instead is streamed in real time from active databases accessible to the network. Furthermore, the system provides a formatting mechanism that translates user selected requirements and parameters from a human-readable format indicating particular attributes of a database to optimize (e.g., database performance, security, compliance, capacity planning, etc.) into data that may be included in a machine learning feature input that specifies which correlations to use (e.g., server operational statistics data, server log data, monitoring metrics, etc.).

20 Claims, 6 Drawing Sheets

| Data Collection | Recommendations | | | | | |
|---|---|---|---|---|---|---|
| | DB engine and compute | DB Performance | Security | Compliance | Capacity planning | Backup and recovery | Resilience |
| configuration and parameters | ✓ | ✓ | ✓ | ✓ | ✓ | ✓ | ✓ |
| Query related data | ✓ | ✓ | ✓ | ✓ | | | |
| DB server operational statistics data | ✓ | ✓ | | | | | |
| DB server log and alert files data | | ✓ | | | ✓ | | |
| Monitoring metrics and alert generation | | ✓ | ✓ | ✓ | ✓ | | ✓ |
| Cost and operational economy calculation and message generation | ✓ | | | | ✓ | | |

METHODS AND SYSTEMS FOR PROVIDING DATABASE DEVELOPMENT RECOMMENDATIONS BASED ON MULTI-MODAL CORRELATIONS DETECTED THROUGH ARTIFICIAL INTELLIGENCE

CROSS-REFERENCE TO RELATED APPLICATIONS

This application is a continuation of U.S. patent application Ser. No. 17/590,471, filed Feb. 1, 2022. The content of the foregoing application is incorporated herein in its entirety by reference.

BACKGROUND

In recent years, the number of electronic communications and applications that are based on electronic communications has increased exponentially. Not only do these electronic communications and applications provide numerous features and functions, but they also transmit data in a variety of ways that are specific to those features and functions. In many cases, the way in which data is transmitted is based on how the electronic communications and applications access data and in particular interface with the data stores, data pools, and/or databases that support those features and functions.

SUMMARY

Methods and systems are described herein for a comprehensive automation and support toolset for database design and development. Conventionally, databases are custom built based on specific requirements and parameters. That is, database developers conventionally rely on database developer specialists to design the architecture and workflow of a database based on an initial set of requirements and parameters. This creates two technical challenges.

First, database development requires a specialize skillset as the development requires choosing a proper technology (e.g., relational vs. non-relational) and determining a best-fit database stack (e.g., relational database service vs. elastic compute cloud). Second, database development requires proactively addressing capacity, performance, cost, resilience, backup and recovery, security, and compliance. For example, if a database is not developed by balancing the various factors above, the database may have an architecture with incorrect database technology configurations, operational inconsistencies, performance issues, and unpredictable outages.

The methods and systems described herein address the technical challenges above through the use of a machine learning model that generates recommendations for database characteristics based on training data that indicates labeled usage statistics (e.g., CPU utilization percentages, free storage, writes per second, reads per seconds, etc.) for existing databases supporting specific features and applications. However, the use of a machine learning model trained on the aforementioned training data creates a novel technical problem. Specifically, conventional machine learning relies entirely on static data (e.g., preexisting labeled usage statistics or existing databases). As such, machine learning model architecture relying on static data for preexisting database arrangements cannot provide any guidance to adjust applications and features or the database design based on current usage, and more specifically, multi-modal correlations of current usage and currently supported applications and features.

Accordingly, the methods and systems overcome the novel technical problem by generating recommendations based on detected correlations of static and dynamic data. For example, the system generates feature inputs for the machine learning model that are based on labeled static data as well as dynamic data indicating current usage. Notably, the system does not retrieve the dynamic data from a data store of known training data, but instead streams the data in real time from active databases accessible to the network. By doing so, the system may retrieve current usage statistics as opposed to predetermined (and potentially out-of-date) data. Furthermore, the system provides a novel formatting mechanism that translates user selected requirements and parameters from a human-readable format indicating particular attributes of a database to optimize (e.g., database performance, security, compliance, capacity planning, etc.) into data that may be included in a machine learning feature input that specifies which correlations to use (e.g., server operational statistics data, server log data, monitoring metrics, etc.). By doing so, the system may support an intuitive user interface that also allows for non-database developer specialists to design the architecture and workflow of databases based on their ever-changing needs and current usage of the databases.

In some aspects, a method or system for providing database development recommendations based on multi-modal correlations detected through artificial intelligence is described. For example, the system may receive a first user action, at a user interface, requesting a first database development recommendation based on first user selected criteria, wherein the first user selected criteria comprise known static data and expected dynamic data for a first database on a network of disparate computing devices. The system may determine, based on the first user selected criteria, a first parameter for the first database development recommendation. The system may determine, based on the first parameter, a first subset of static and dynamic training data for generating a first feature input, wherein the first subset comprises data streamed in real time from databases accessible to the network. The system may input the first feature input into a first machine learning model to generate a first output from the first machine learning model. The system may select a first database design element from a plurality of database design elements based on the first output. The system may generate, at the user interface, the first database development recommendation based on the first database design element.

Various other aspects, features, and advantages of the invention will be apparent through the detailed description of the invention and the drawings attached hereto. It is also to be understood that both the foregoing general description and the following detailed description are examples, and not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion" refers to a part of, or the entirety of (i.e., the entire portion), a given item (e.g., data) unless the context clearly dictates otherwise.

BRIEF DESCRIPTION OF THE DRAWINGS

FIG. 6 shows a chart indicating particular static and dynamic data that is retrieved when optimizing a given parameter, in accordance with one or more embodiments.

DETAILED DESCRIPTION OF THE DRAWINGS

In the following description, for the purposes of explanation, numerous specific details are set forth in order to provide a thorough understanding of the embodiments of the invention. It will be appreciated, however, by those having skill in the art, that the embodiments of the invention may be practiced without these specific details or with an equivalent arrangement. In other cases, well-known structures and devices are shown in block diagram form in order to avoid unnecessarily obscuring the embodiments of the invention.

Figure 1:
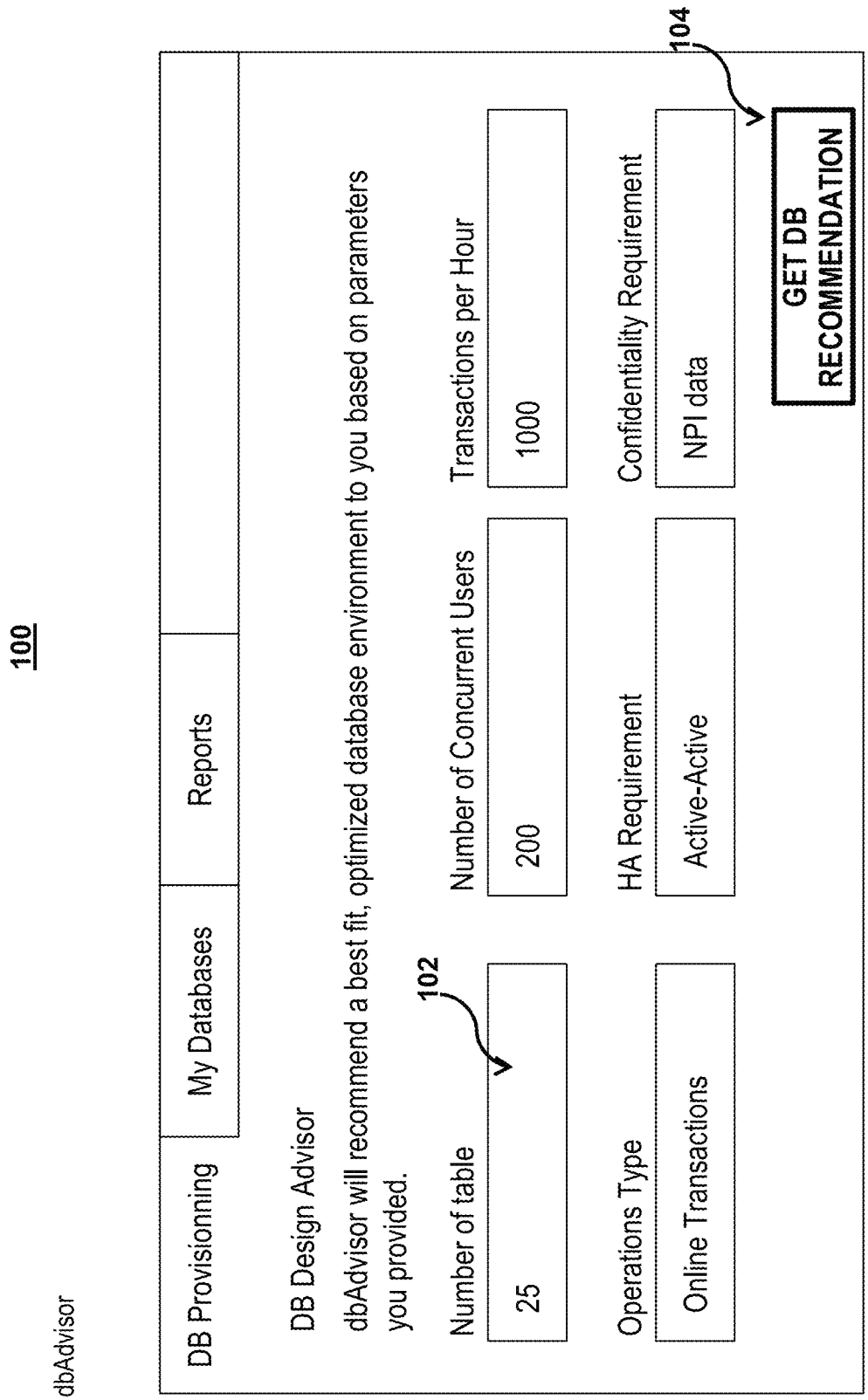
FIG. 1 shows an illustrative user interface for requesting database development recommendations based on multimodal correlations detected through artificial intelligence, in accordance with one or more embodiments.

FIG. 1 shows an illustrative user interface for requesting database development recommendations based on multi-modal correlations detected through artificial intelligence, in accordance with one or more embodiments. In some embodiments, user interface 100 may comprise a user interface for accessing a comprehensive automation and support toolset for database design and development (e.g., referred to herein as "the system"). For example, user interface 100 represents an illustrative user interface for requesting database development recommendations based on user inputted criteria (e.g., criteria 102). In some embodiments, the system may be a tool used to address the challenges of database design and development. The system may comprise a parameterized and integrated support toolset for database developers and owners to have a worry-free database environment that is designed to best fit their application needs both operationally and economically. The system may provide proactive checks on an ongoing basis, ensuring that database accesses are optimized and that the data stored is the most secure, most scalable, and most relevant. The system may provide this based on retrieving and utilizing data streamed (or otherwise transmitted in a continuous, real-time, and/or near-real-time, manner) from databases accessible to the network. The system may provide a recommendation based on one or more artificial intelligence and/or machine learning models (e.g., referred to collectively herein as "machine learning models") with pattern matching algorithms based on statistics collected from database usages and the ever-improving templates built by the system.

The system may comprise numerous components (e.g., as described in FIG. 3 below) to generate user interface 100 and/or power the system. For example, the system may include one or more lambda functions (e.g., executed by control circuitry) to provide provision and data collection as well as reporting. The system may also include a machine learning based calculation and analysis engine used to optimize the database design and a web-based interface (e.g., user interface 100). In some embodiments, the system may be built using a cloud-based approach and access a central repository. The central repository may receive and store usage statistics that are used to perform cost analysis and capacity allocation determinations. The system may use these determinations to generate one or more recommendations related to database development. A user may trigger the generation of a recommendation based on selecting icon 104.

As referred to herein, a recommendation may provide any content. For example, the recommendation may comprise advice on the database engine and computations performed thereby (e.g., cost analysis and capacity allocation/usages). The system may provide a recommendation based on existing database usage statistics that are stored and analyzed by the system. For example, the system may receive (e.g., via user interface 100) one or more user selected criteria. The user selected criteria may comprise operational characteristics that indicate how a given database will be used and/or what features or functions it may provide. That is, the user selected criteria may comprise quantitative or qualitative characteristics about how the database is to be used, what features/functions it will support, and/or other expected usage characteristics (e.g., the number of tables, the number of concurrent users, the number of transactions an hour, the operation system, the application types, the security/compliance/privacy requirements, etc.).

Based on this user selected criteria, the system may generate one or more parameters to govern the database design. The parameters may refer to optimizations in one or more design goals for which the recommendations may advise. For example, the system may determine specific parameters to optimize based on the expected needs of the database (e.g., as entered by a user) and/or any additional rules sets or protocols triggered by the user selected criteria. For example, the user selected criteria may comprise known static data and expected dynamic data for a first database on a network of disparate computing devices.

As referred to herein, static data may refer to data that does not change with usage. For example, static data may comprise data stored in a data dictionary, a system catalog, and/or an information schema that depends on a database engine. Static data may comprise one or more given applications, features, and/or functions that are supported by a given database as well as a current database design feature. For example, static data may comprise database configuration parameters (e.g., relational database service metadata or data dictionary schemas), object numbers and relationships, and/or security information (e.g., privileges, number of access accounts, password policies, etc.).

In contrast to static data, dynamic data may comprise data that changes with usage. For example, dynamic data may comprise the number of current users, the number of current transaction requests, and/or usage statistics (e.g., CPU utilization percentage, available storage, freeable memory, writes per second, reads per second, etc.). That is, dynamic data may comprise performance and resource utilization data that is available in dynamic views from one or more real-time network locations or services (e.g., pg_views for PostgreSQL, v$ views for Oracle, sys schema for SQL Server, AWS CloudWatch). In some embodiments (e.g., as described in FIG. 5 below), the system may determine network locations for this information and automatically retrieve this information to generate a feature input for a machine learning model, determine whether a recommendation should be made, and/or monitor the implementation of a recommendation.

For example, in response to receiving a user selected criterion that the database may have 1000 concurrent users, the system may optimize a parameter for database performance. In another example, in response to a user selected criterion regarding an application that may house sensitive user information, the system may determine a parameter for optimizing database security. In another example, the system may provide advice on database performance. This may include server statistics and database collection and analysis statistics. The system may further generate reports based on statistics collected via one or more lambda functions.

In another example, a recommendation may comprise advice on security of the database and/or protocol for implementing better security (e.g., security configurations, access control, and policy). In another example, a recommendation may comprise advice on compliance (e.g., reports on government compliance, privileged account access, functional account access, PCI (Payment Card Information)/NPI (Nonpublic Personal Information) data encryption and access, and Data Definition Language (DDL) related changes). The system may also provide recommendations that advise on capacity planning. For example, the system may provide calculations regarding capacity trends, current and/or predicted CPU, memory, and/or storage usage as well as capacity utilization trends. In another example, the system may provide recommendations that advise on backup and recovery requirements, testing, and reporting as well as resilience.

Figure 2:
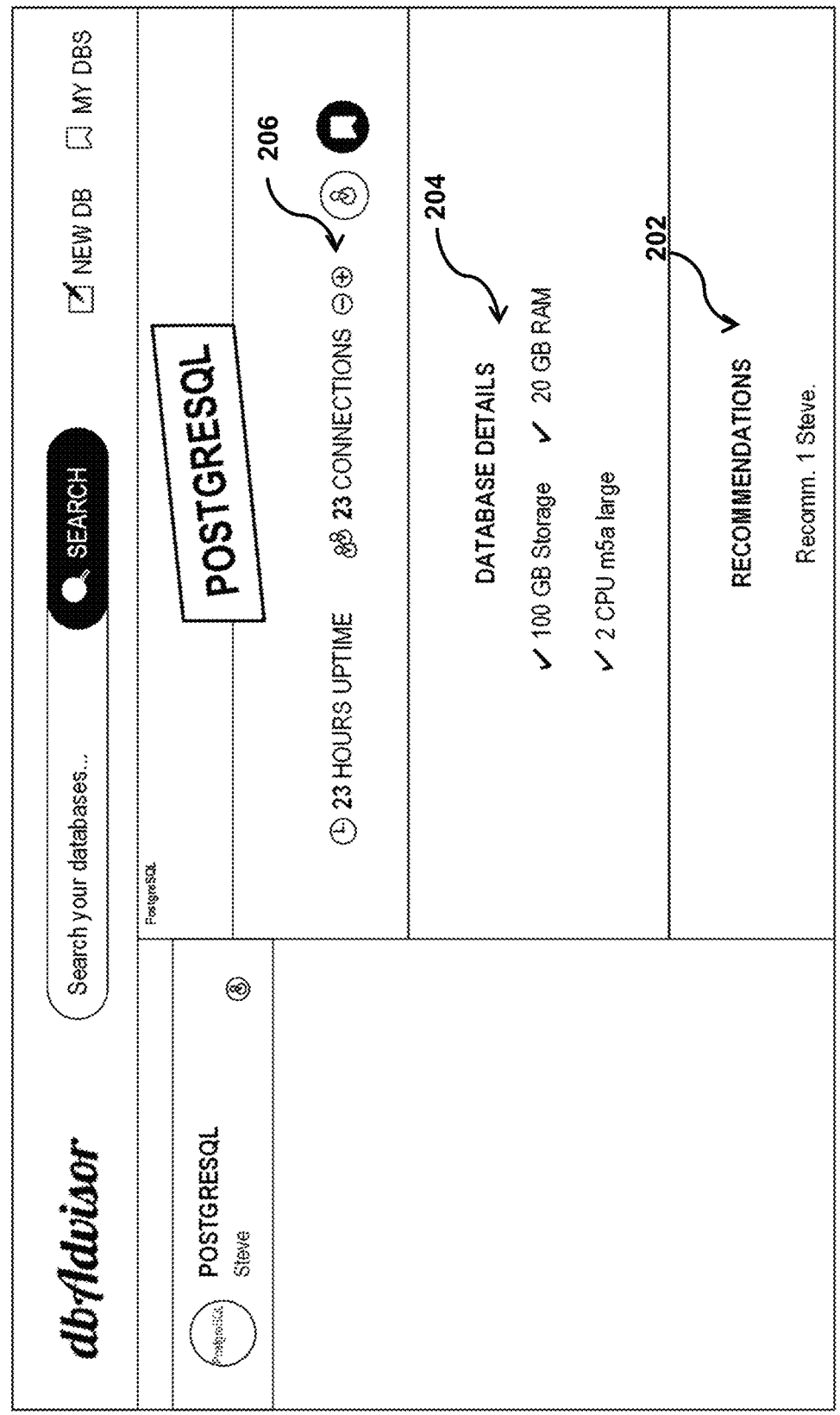
FIG. 2 shows an illustrative user interface for providing database development recommendations based on multi-modal correlations detected through artificial intelligence, in accordance with one or more embodiments.

FIG. 2 shows an illustrative user interface for providing database development recommendations based on multimodal correlations detected through artificial intelligence, in accordance with one or more embodiments. For example, the system and methods described herein may generate for display, on a local display device (e.g., user terminal 324 (FIG. 3) described below), a user interface for providing database development recommendations. User interface 200 may comprise an interface for providing database development recommendations. In some embodiments, user interface 200 may comprise an integrated database development management system that may include a database development management system that integrates multiple other database development management systems. Through user interface 200, the integrated database development management system may monitor usage statistics and/or perform one or more operations such as generating additional recommendations.

User interface 200 may generate display data related to a detected issue and/or recommendation. In some embodiments, user interface 200 (or the data therein) may be presented as a status page. The status page may include summary information about database development, affected systems/domains, responsible team members (e.g., analysis assigned to implement a recommendation), etc. The status page may also include queries that may be performed (e.g., queries based on progress, affected systems, milestones, governance, etc.). User interface 200 may also include a Gantt chart indicating progress for one or more tasks and sub-tasks, and it may provide filters and/or view changes. User interface 200 may also include analyst listings and metrics related to the database development (e.g., concurrency, throughput, etc.). User interface 200 may also include an icon (e.g., recommendation 202) for accessing additional information about an issue and/or recommendation (e.g., recommendation 202). User interface 200 may also include expected usage statistics (e.g., statistics 204) with a recommendation (e.g., recommendation 202). The system may also provide supplemental data about the implementation of a current or previous recommendation (e.g., implementation details 206).

The system may provide one or more recommendations related to database development and design elements. As referred to herein, a design element comprises a feature of a database that distinguishes the database from other databases. For example, a design element may comprise characteristics related to a database schema, schema objects, indexes, tables (e.g., data tables, join tables, subset tables, validation tables), fields and columns, records and rows, keys (e.g., primary or foreign), relationships (e.g., One-to-One, One-to-Many, Many-to-One) and/or data types (e.g., alphanumeric, numeric, date and time). For example, characteristics of the database schema may indicate a type of schema such as whether the database follows a conceptual model, an internal model, or an external mode. A conceptual model is a database model which deals with organizational structures that are used to define database structures such as tables and constraints. An internal model deals with the physical storage of the database, as well as access to the data, such as through data storage in tables and the use of indexes to expedite data access. Notably, the internal model separates the physical requirements of the hardware and the operating system from the data model. An external model, or application interface, deals with methods through which users may access the schema, such as through the use of a data input form. The external model allows relationships to be created between the user application and the data model.

Figure 3:
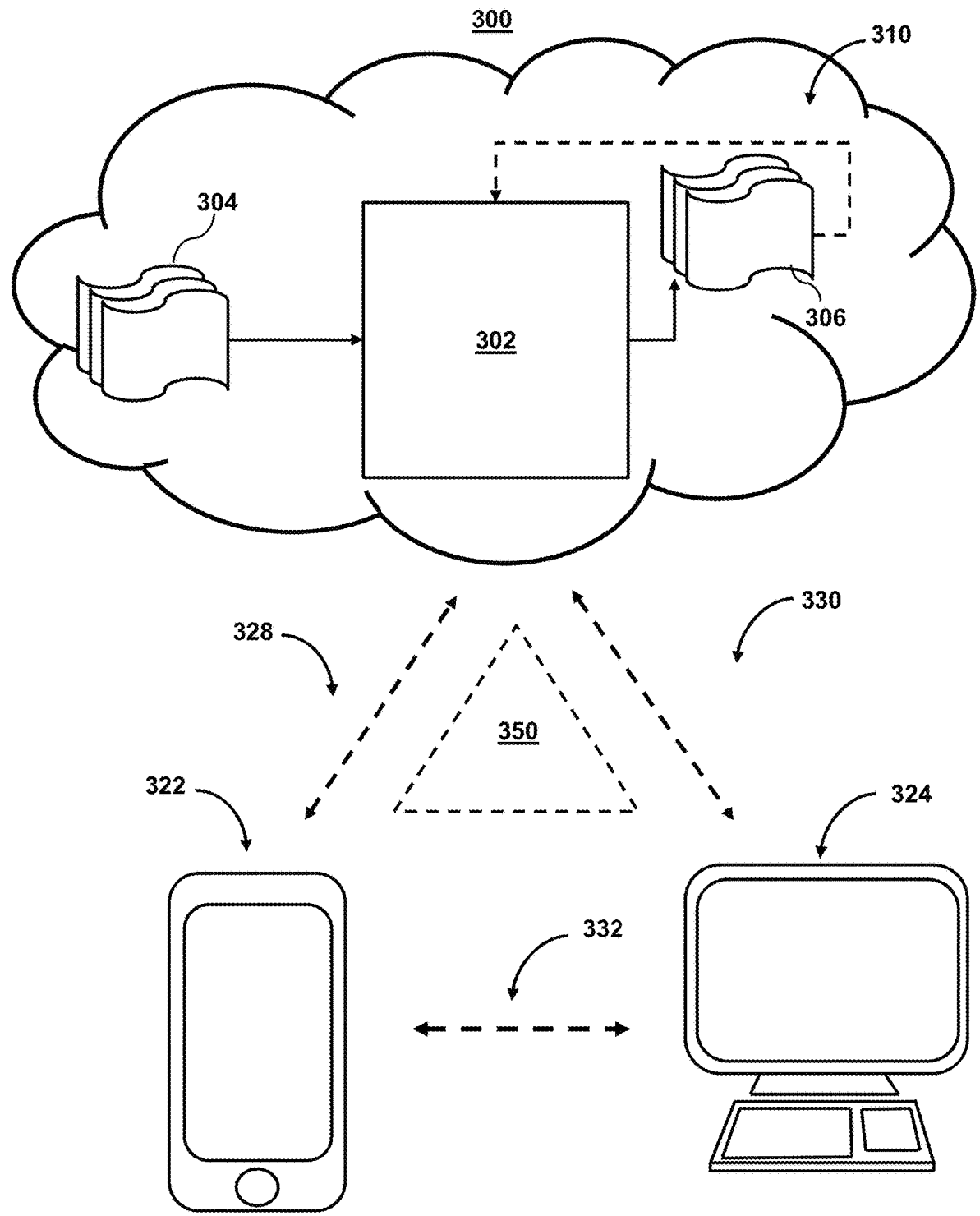
FIG. 3 shows illustrative system components for database development recommendations, in accordance with one or more embodiments.

FIG. 3 shows illustrative system components for generating database recommendations, in accordance with one or more embodiments. For example, the system may represent the components used for monitoring data quality issues in non-native data over disparate computer networks, as shown in FIG. 1. As shown in FIG. 3, system 300 may include mobile device 322 and user terminal 324. While shown as a smartphone and personal computer, respectively, in FIG. 3, it should be noted that mobile device 322 and user terminal 324 may be any computing device, including, but not limited to, a laptop computer, a tablet computer, a handheld computer, or other computer equipment (e.g., a server), including "smart," wireless, wearable, and/or mobile devices. FIG. 3 also includes cloud components 310. Cloud components 310 may alternatively be any computing device as described above and may include any type of mobile terminal, fixed terminal, or other device. For example, cloud components 310 may be implemented as a cloud computing system and may feature one or more component devices. For example, cloud components 310 may house and/or enable system 100 (FIG. 1).

It should also be noted that system 300 is not limited to three devices. Users may, for instance, utilize one or more devices to interact with one another, one or more servers, or other components of system 300. It should be noted that, while one or more operations are described herein as being performed by particular components of system 300, those operations may, in some embodiments, be performed by other components of system 300. As an example, while one or more operations are described herein as being performed by components of mobile device 322, those operations may, in some embodiments, be performed by components of cloud components 310. In some embodiments, the various computers and systems described herein may include one or more computing devices that are programmed to perform the described functions. Additionally, or alternatively, multiple users may interact with system 300 and/or one or more components of system 300. For example, in one embodiment, a first user and a second user may interact (e.g., by exchanging user information about a database development issue) with system 300 using two different components.

With respect to the components of mobile device 322, user terminal 324, and cloud components 310, each of these devices may receive content and data via input/output (hereinafter "I/O") paths. Each of these devices may also include processors and/or control circuitry to send and receive commands, requests, and other suitable data using the I/O paths. For example, system 300 may include input/output circuitry configured to generate for display, on a user interface, the recommendation based on the first difference.

The control circuitry may comprise any suitable processing, storage, and/or input/output circuitry. Each of these devices may also include a user input interface and/or user output interface (e.g., a display) for use in receiving and displaying data. For example, as shown in FIG. 3, both mobile device 322 and user terminal 324 include a display upon which to display data (e.g., user information, detected issues, recommendations, queries, and/or notifications). For example, system 300 may include control circuitry configured to monitor database development and/or dynamic data.

Additionally, as mobile device 322 and user terminal 324 are shown as touchscreen smartphones, these displays also act as user input interfaces. It should be noted that in some embodiments, the devices may have neither user input interfaces nor displays and may instead receive and display content using another device (e.g., a dedicated display device such as a computer screen, and/or a dedicated input device such as a remote control, mouse, voice input, etc.). Additionally, the devices in system 300 may run an application (or another suitable program). The application may cause the processors and/or control circuitry to perform operations related to monitoring for database development issues and/or generating recommendations related to usage statistics, dynamic data, detected issues, queries, and/or notifications.

Each of these devices may also include electronic storages. The electronic storages may include non-transitory storage media that electronically stores information. The electronic storage media of the electronic storages may include one or both of (i) system storage that is provided integrally (e.g., substantially non-removable) with servers or client devices, or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical discs, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storages may store software algorithms, information determined by the processors, information obtained from servers, information obtained from client devices, or other information that enables the functionality as described herein. For example, system 300 may include storage circuitry configured to store a model, wherein the model is trained to determine a dynamic threshold number corresponding to criteria based on historical data patterns.

FIG. 3 also includes communication paths 328, 330, and 332. Communication paths 328, 330, and 332 may include the internet, a mobile phone network, a mobile voice or data network (e.g., a 5G or LTE network), a cable network, a public switched telephone network, or other types of communications networks or combinations of communications networks. Communication paths 328, 330, and 332 may separately or together include one or more communication paths, such as a satellite path, a fiber-optic path, a cable path, a path that supports internet communications (e.g., TCP/IP), free-space connections (e.g., for broadcast or other wireless signals), or any other suitable wired or wireless communications path or combination of such paths. The computing devices may include additional communication paths linking a plurality of hardware, software, and/or firmware components operating together. For example, the computing devices may be implemented by a cloud of computing platforms operating together as the computing devices.

Cloud components 310 may be a database configured to store user information. For example, the database may include information that the system has collected about static data, dynamic data, current or expected design elements, a data source, a recommendation, a criterion, and/or a historical pattern, both actively and passively. For example, the information may describe one or more characteristics of static data, dynamic data, current or expected design elements, a data source, a recommendation, an issue, a recommendation, a criterion, and/or a historical pattern. Alternatively or additionally, the system may act as a clearinghouse for multiple sources of information. This information may be compiled into a use profile. Cloud components 310 may also include control circuitry configured to perform the various operations needed to generate recommendations. For example, the cloud components 310 may include cloud-based storage circuitry configured to generate recommendations. Cloud components 310 may also include cloud-based control circuitry configured to run processes to determine recommendations. Cloud components 310 may also include cloud-based input/output circuitry configured to display recommendations.

Cloud components 310 may include model 302, which may be a machine learning model. Model 302 may take inputs 304 and provide outputs 306. The inputs may include multiple datasets, such as a training dataset and a test dataset. Each of the plurality of datasets (e.g., inputs 304) may include data subsets related to user data, predicted static and/or dynamic data, and/or actual static or dynamic data. In some embodiments, outputs 306 may be fed back to model 302 as input to train model 302 (e.g., alone or in conjunction with user indications of the accuracy of outputs 306, labels associated with the inputs, or with other reference feedback information). For example, the system may receive a first labeled feature input, wherein the first labeled feature input is labeled with known static data and/or dynamic data for the first labeled feature input. The system may then train the first machine learning model to classify the first labeled feature input with the known prediction (e.g., about an optimization, a data source, a recommendation, a false positive recommendation, a criterion, and/or a historical pattern).

In a variety of embodiments, model 302 may update its configurations (e.g., weights, biases, or other parameters) based on the assessment of its prediction (e.g., outputs 306) and reference feedback information (e.g., user indication of accuracy, reference labels, or other information). In a variety of embodiments, where model 302 is a neural network, connection weights may be adjusted to reconcile differences between the neural network's prediction and reference feedback. In a further use case, one or more neurons (or nodes) of the neural network may require that their respective errors are sent backward through the neural network to facilitate the update process (e.g., backpropagation of error). Updates to the connection weights may, for example, be reflective of the magnitude of error propagated backward after a forward pass has been completed. In this way, for example, the model 302 may be trained to generate better predictions (e.g., about an optimization, a data source, a recommendation, a false positive recommendation, a criterion, and/or a historical pattern).

In some embodiments, model 302 may include an artificial neural network. In such embodiments, model 302 may include an input layer and one or more hidden layers. Each neural unit of model 302 may be connected with many other neural units of model 302. Such connections can be enforcing or inhibitory in their effect on the activation state of connected neural units. In some embodiments, each individual neural unit may have a summation function that combines the values of all of its inputs. In some embodiments, each connection (or the neural unit itself) may have a threshold function such that the signal must surpass it before it propagates to other neural units. Model 302 may be self-learning and trained, rather than explicitly programmed, and can perform significantly better in certain areas of problem solving, as compared to traditional computer programs. During training, an output layer of model 302 may correspond to a classification of model 302, and an input known to correspond to that classification may be input into an input layer of model 302 during training. During testing, an input without a known classification may be input into the input layer, and a determined classification may be output.

In some embodiments, model 302 may include multiple layers (e.g., where a signal path traverses from front layers to back layers). In some embodiments, backpropagation techniques may be utilized by model 302 where forward stimulation is used to reset weights on the "front" neural units. In some embodiments, stimulation and inhibition for model 302 may be more free flowing, with connections interacting in a more chaotic and complex fashion. During testing, an output layer of model 302 may indicate whether a given input corresponds to a classification of model 302.

In some embodiments, model 302 may predict a false positive recommendation (or that a recommendation is likely a false positive). For example, the system may determine that particular characteristics are more likely to be indicative of a prediction. In some embodiments, the model (e.g., model 302) may automatically perform actions based on outputs 306. In some embodiments, the model (e.g., model 302) may not perform any actions. The output of the model (e.g., model 302) may be used to generate for display, on a user interface, a recommendation based on the false positive (or determine not to generate a recommendation).

System 300 also includes and application programming interface layer (e.g., API layer 350). API layer 350 may allow the system to generate recommendations across different devices. In some embodiments, API layer 350 may be implemented on mobile device 322 or user terminal 324. Alternatively or additionally, API layer 350 may reside on one or more of cloud components 310. API layer 350 (which may be a REST or Web services API layer) may provide a decoupled interface to data and/or functionality of one or more applications. API layer 350 may provide a common, language-agnostic way of interacting with an application. Web services APIs offer a well-defined contract, called WSDL, that describes the services in terms of their operations and the data types used to exchange information. REST APIs do not typically have this contract; instead, they are documented with client libraries for most common languages, including Ruby, Java, PHP, and JavaScript. SOAP Web services have traditionally been adopted in the enterprise for publishing internal services, as well as for exchanging information with partners in B2B transactions.

API layer 350 may use various architectural arrangements. For example, system 300 may be partially based on API layer 350, such that there is strong adoption of SOAP and RESTful Web services, using resources like Service Repository and Developer Portal, but with low governance, standardization, and separation of concerns. Alternatively, system 300 may be fully based on API layer 350, such that separation of concerns between layers like API layer 350, services, and applications are in place.

In some embodiments, the system architecture may use a microservice approach. Such systems may use two types of layers: Front-End Layer and Back-End Layer, where microservices reside. In this kind of architecture, the role of the API layer 350 may provide integration between Front-End and Back-End. In such cases, API layer 350 may use RESTful APIs (exposition to front-end or even communication between microservices). API layer 350 may use AMQP (e.g., Kafka, RabbitMQ, etc.). API layer 350 may use incipient usage of new communications protocols such as gRPC, Thrift, etc.

In some embodiments, the system architecture may use an open API approach. In such cases, API layer 350 may use commercial or open-source API platforms and their modules. API layer 350 may use developer portal. API layer 350 may use strong security constraints applying WAF and DDOS protection, and API layer 350 may use RESTful APIs as standard for external integration.

Figure 4:
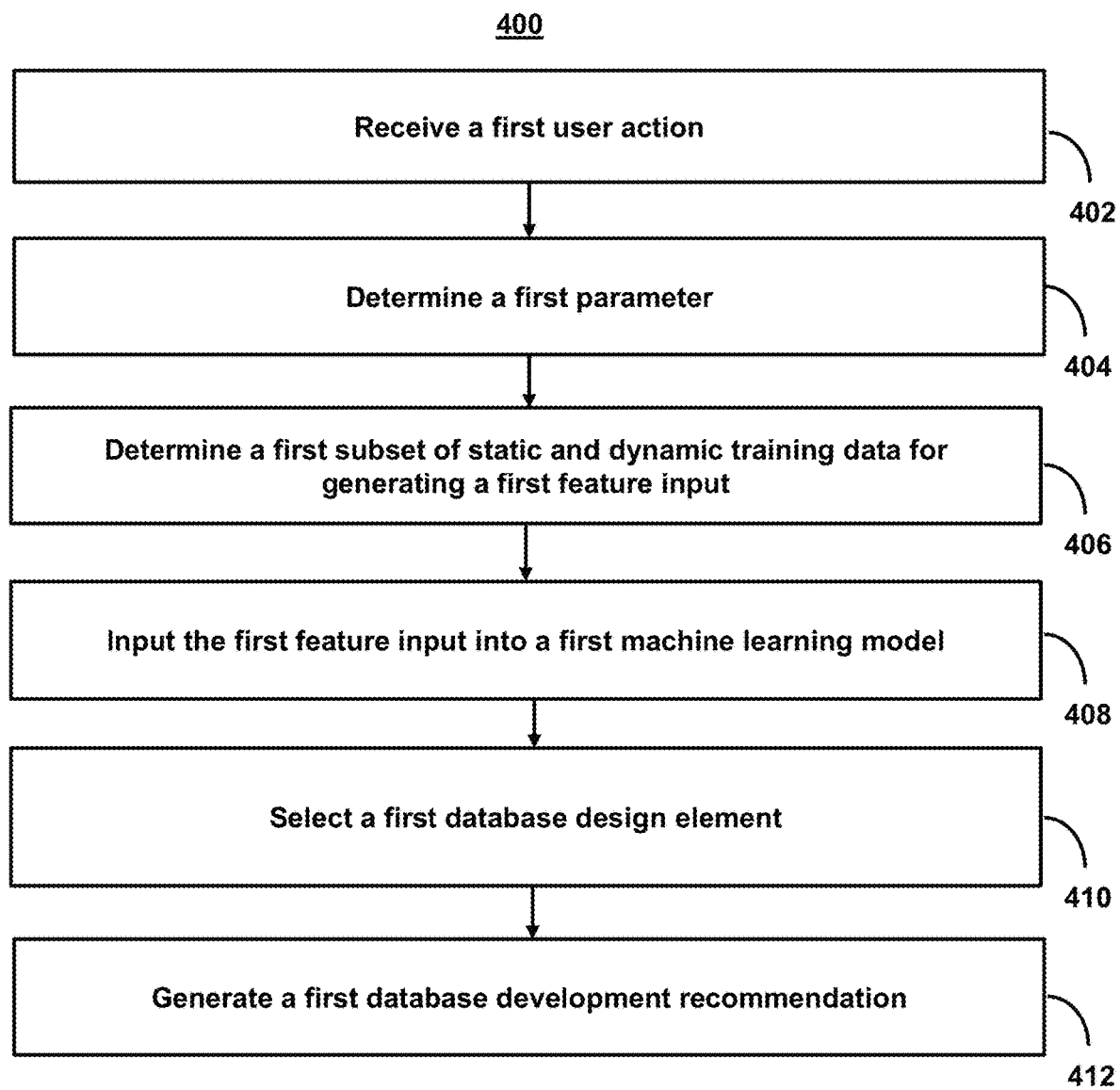
FIG. 4 shows a flowchart of the steps involved in providing database development recommendations based on multi-modal correlations detected through artificial intelligence, in accordance with one or more embodiments.

FIG. 4 shows a flowchart of the steps involved in providing database development recommendations based on multi-modal correlations detected through artificial intelligence, in accordance with one or more embodiments. For example, process 400 may represent the steps taken by one or more devices as shown in FIGS. 1-3 when providing database development recommendations. For example, the system may use user interface 100 (FIG. 1) to receive user selected criteria and then generate user interface 200 (FIG. 2) to provide database development recommendations.

At step 402, process 400 (e.g., using one or more components in system 300 (FIG. 3)) receives a first user action. For example, the system may receive a first user action, at a user interface, requesting a first database development recommendation based on first user selected criteria, wherein the first user selected criteria comprise known static data and expected dynamic data for a first database on a network of disparate computing devices. The known static data may comprise data that is unlikely to change with use (e.g., features supported, compliance requirements, etc.), whereas the dynamic data may comprise data that may change with use (e.g., usage statistics). That is, dynamic data may comprise performance and resource utilization data that is available in dynamic views from one or more real-time network locations or services as described below in relation to FIG. 5.

For example, the system may receive one or more user selected criteria (e.g., via user interface 100 (FIG. 1)). Furthermore, these user selected criteria may be in a human-readable format and may use terminology consistent with that known to a user. This terminology may then be used by the system to determine specific parameters for a database design. As the system performs the internal terminology conversion, the system allows a user to more easily and intuitively enter criteria. In some embodiments, the user selected criteria may comprise operational characteristics that indicate how a given database will be used and/or what features or functions it may provide.

At step 404, process 400 (e.g., using one or more components in system 300 (FIG. 3)) determines a first parameter. For example, the system may determine, based on the first user selected criteria, a first parameter for the first database development recommendation. For example, the parameters may refer to optimizations in one or more design goals or performance characteristics for which the recommendations may advise. For example, the system may determine specific parameters to optimize based on the expected needs of the database (e.g., as entered by a user) and/or any additional rules sets or protocols triggered by the user selected criteria. These parameters may refer to a predetermined list of optimizations that are automatically selected by the system based on the user selected criteria (e.g., database engine and computation, database performance, security, compliance, capacity planning, backup and recovery, and/or resilience). By doing so, the system does not require a user (e.g., entering criteria) to have a deep knowledge of design criteria and/or system requirements. For example, the known static data may comprise a function serviced by the first database and the expected dynamic data may comprise expected usage statistics for the first database. The system may then determine a first parameter based on the function serviced by the first database and the expected usage statistics for the first database.

At step 406, process 400 (e.g., using one or more components in system 300 (FIG. 3)) determines a first subset of static and dynamic training data for generating a first feature input. For example, the system may determine, based on the first parameter, a first subset of static and dynamic training data for generating a first feature input, wherein the first subset comprises data streamed in real time from databases accessible to the network. For example, in response to identifying static data (e.g., features supported by the database) and expected dynamic data (e.g., a number of concurrent users), the system may search for current databases that have the static features and support similar dynamic data. The system may then retrieve data from those systems (e.g., performance and resource utilization data that is available in dynamic views from one or more real-time network locations or services) to detect correlations between the database design and the optimizations of one or more parameters.

For example, when determining the first subset of static and dynamic training data for generating the first feature input, the system may filter available training data based on the known static data to generate a filtered dataset. The system may then retrieve labeled dynamic data corresponding to the filtered dataset. The labeled dataset may comprise current usage statistics for databases having a given design or design element. The system may then use this data to optimize a given parameter. For example, FIG. 6 shows a chart indicating particular static and dynamic data that is retrieved when optimizing a given parameter. In some embodiments, retrieving the dynamic data corresponding to the filtered dataset further may comprise determining a network location, on the network, comprising the labeled dynamic data, generating a query for retrieving the labeled dynamic data, and automatically retrieving, based on the query, the labeled dynamic data from the network location.

In some embodiments, the system may verify that the data is recent and/or up to date. For example, the system may determine an update period for a network location comprising the labeled dynamic data, compare the update period to a threshold update period, and retrieve the labeled dynamic data in response to the update period corresponding to the threshold update period.

At step 408, process 400 (e.g., using one or more components in system 300 (FIG. 3)) inputs the first feature input into a first machine learning model. For example, the system may input the first feature input into a first machine learning model to generate a first output from the first machine learning model. For example, the system may generate feature input that comprises arrays of data that may be processed by a machine learning model.

In some embodiments, the system may select a given machine learning model (e.g., a machine learning model having particular architecture) based on the parameter to be optimized. For example, the machine learning model may detect patterns within the labeled training data subset. The model that is selected and the training considerations may depend on one or more factors determined by the system. For example, when determining the data points, feature input matrix, and/or model training considerations, the system may determine minimal data required (e.g., regular running cycles, peak operations, availability events, and/or other requirements), prediction vs. recommendation accuracy (and may adjust a recommendation based on learning accuracy), and the size and composition of training data sets vs. testing sets (e.g., how the data is split, collected, and used in training and testing). In such cases, the system may determine, based on the first parameter, a first model criterion for the first database development recommendation. The system may then select the first machine learning model from a plurality of machine learning models based on the first model criterion.

At step 410, process 400 (e.g., using one or more components in system 300 (FIG. 3)) selects a first database design element. For example, the system may select a first database design element from a plurality of database design elements based on the first output. For example, the system may recommend a given schema, table number, data types, relational structure, etc.

At step 412, process 400 (e.g., using one or more components in system 300 (FIG. 3)) generates a first database development recommendation. For example, the system may generate, at the user interface, the first database development recommendation based on the first database design element. In some embodiments, the system may provide expected usage statistics (e.g., statistics 204 (FIG. 2)) with a recommendation (e.g., recommendation 202 (FIG. 2)). The system may also provide supplemental data about the implementation of a current or previous recommendation (e.g., implementation details 206 (FIG. 2)).

In some embodiments, the system may continue to monitor database static and/or dynamic data after implementing a recommendation. For example, the system may monitor the database to determine whether the current (or actual) static and/or dynamic data corresponds to the expected static and/or dynamic data as well as the user selected criteria. If the system determines that it does not (e.g., usage is within a threshold difference and/or a feature or function is not being used), the system may recommend a change. For example, the system may make a subsequent recommendation based on the update information. Additionally or alternatively, the system may request (or monitor for) new user selected criteria (or provide recommendations for new user selected criteria).

For example, the system may, after generating the first database development recommendation, receive a second user action, at the user interface, requesting a second database development recommendation based on second user selected criteria. The system may determine, based on the second user selected criteria, a second parameter for the second database development recommendation. The system may determine, based on the second parameter, a second subset of static and dynamic training data for generating a second feature input. The system may input the second feature input into a second machine learning model to generate a second output from the second machine learning model. The system may select a second database design element from the plurality of database design elements based on the second output. The system may generate, at the user interface, the second database development recommendation based on the second database design element.

It is contemplated that the steps or descriptions in FIG. 4 may be used with any other embodiment of this disclosure. In addition, the steps and descriptions described in relation to FIG. 4 may be done in alternative orders or in parallel to further the purposes of this disclosure. For example, each of these steps may be performed in any order, in parallel, or simultaneously to reduce lag or increase the speed of the system or method. Furthermore, it should be noted that any of the devices or equipment discussed in relation to FIGS. 1-3 could be used to perform one of more of the steps in FIG. 4.

Figure 5:
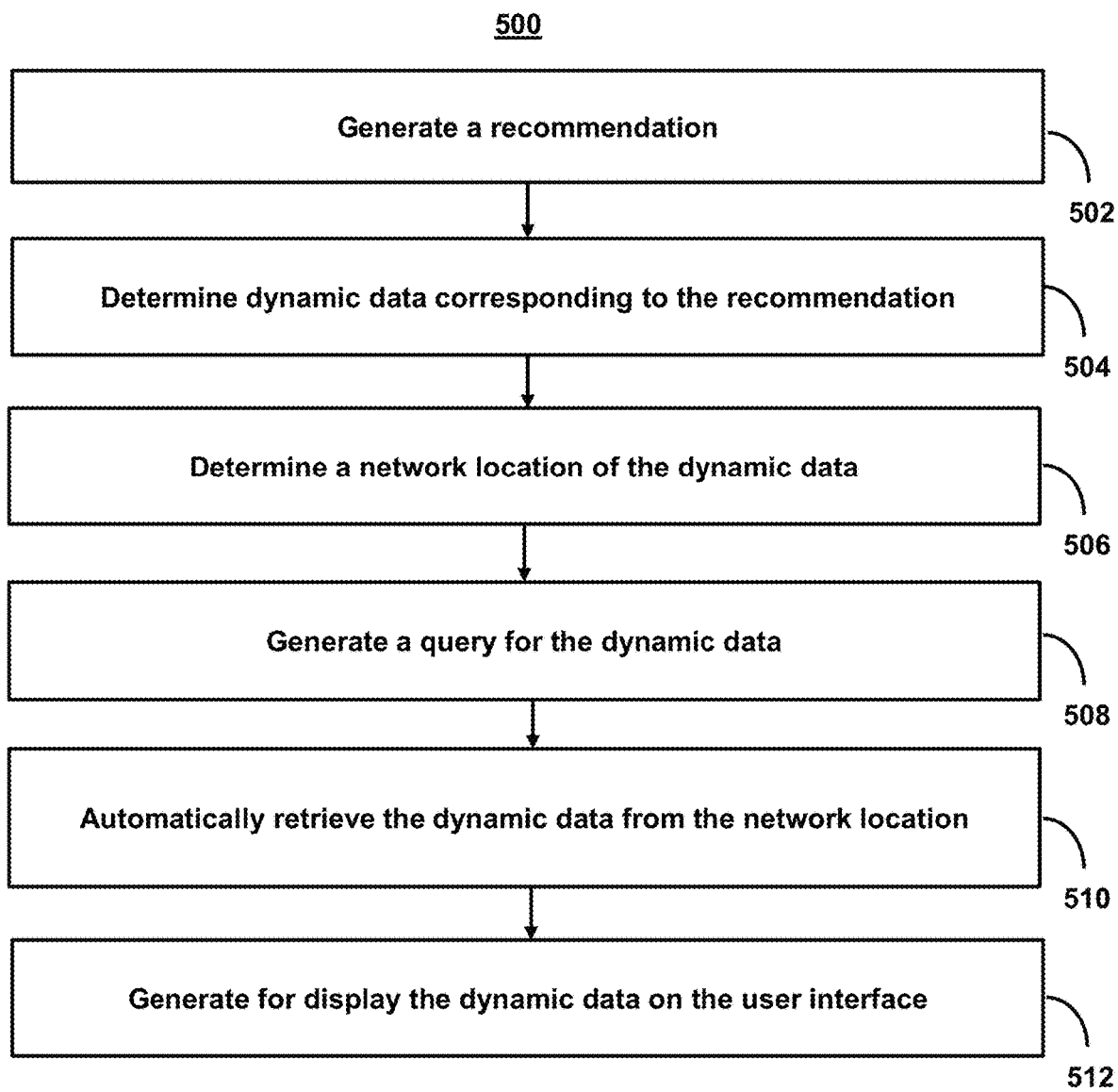
FIG. 5 shows a flowchart of the steps involved in retrieving dynamic data related to database development recommendations, in accordance with one or more embodiments.

FIG. 5 shows a flowchart of the steps involved in retrieving dynamic data related to database development recommendations, in accordance with one or more embodiments. For example, process 500 may represent the steps taken by one or more devices, as shown in FIGS. 1-3, when retrieving dynamic data for generating a feature input, monitoring current usage, and/or predicting expected usage following the implementation of a recommendation. For example, the system may locate information, determine a network pathway to quickly and efficiently retrieve this information, and/or pre-fetch this information.

For example, the system may determine new dynamic data corresponding to an implementation of the first database development recommendation. The system may determine a network location, on the network, comprising the new dynamic data. The system may generate a query for retrieving the new dynamic data. The system may automatically retrieve, based on the query, the new dynamic data from the network location. The system may generate, at the user interface, the new dynamic data.

At step 502, process 500 (e.g., using one or more components in system 300 (FIG. 3)) generates a recommendation. For example, the system may, in response to a user query or triggered based on ongoing monitoring, generate, at a user interface, a recommendation. For example, the system may generate user interface 200 (FIG. 2).

At step 504, process 500 (e.g., using one or more components in system 300 (FIG. 3)) determines dynamic data corresponding to the recommendation. For example, the system may determine dynamic data corresponding to the recommendation. In some embodiments, the system may retrieve usage statistics from a known database based on a previous implementation or based on a current user request.

At step 506, process 500 (e.g., using one or more components in system 300 (FIG. 3)) determines a network location of the dynamic data. For example, the system may determine a network location of the dynamic data across a computer network. In some embodiments, a network location may be a profile that includes a collection of network and sharing settings that are applied to the network the system is connected to, including user settings, authorizations, user information access restrictions, data source availability, etc. Based on the network location assigned to the system's active network connection, features such as information retrieval, network discovery, etc., may be enabled or disabled.

In some embodiments, the system may retrieve labeled data (e.g., data indicating current usage in a database with one or more known design elements and/or features). The system may retrieve the labeled dynamic data corresponding to a filtered dataset further by querying a metadata retrieval layer and generating a common function call using the metadata retrieval layer. By using the common function call, the system may communicate with numerous devices (and databases) along the network.

At step 508, process 500 (e.g., using one or more components in system 300 (FIG. 3)) generates a query for the dynamic data. For example, the system may generate a network pathway (e.g., on the network associated with a data source of the monitored data entries) to the dynamic data and transmit a query for the dynamic data. In some embodiments, the system may open a session with a source of the dynamic data to retrieve a real-time stream of the data. For example, the system may generate one or more network pathways based on correlation-based network analysis combined with machine-learning techniques. For example, the system may use machine learning (e.g., as described in FIG. 3 above) to select a path for traffic in a network or between or across multiple networks. The system may traverse and/or process information for numerous types of networks, including circuit-switched networks, such as the public switched telephone network (PSTN), and computer networks, such as the Internet.

At step 510, process 500 (e.g., using one or more components in system 300 (FIG. 3)) automatically retrieves the dynamic data from the network location. For example, the system may automatically retrieve the dynamic data from the network location in response to the recommendation. For example, during the information retrieval process, the system may obtain information from system resources that are relevant to an information need about the recommendation from the collection of those resources.

At step 512, process 500 (e.g., using one or more components in system 300 (FIG. 3)) generates for display the dynamic data on a user interface. For example, the system may simultaneously generate user information in user interface 200 (FIG. 2) in order for a user to determine current usage, expected usage, etc.

It is contemplated that the steps or descriptions of FIG. 5 may be used with any other embodiment of this disclosure. In addition, the steps and descriptions described in relation to FIG. 5 may be done in alternative orders or in parallel to further the purposes of this disclosure. For example, each of these steps may be performed in any order, in parallel, or simultaneously to reduce lag or increase the speed of the system or method. Furthermore, it should be noted that any of the devices or equipment discussed in relation to FIGS. 1-3 could be used to perform one or more of the steps in FIG. 5.

The above-described embodiments of the present disclosure are presented for purposes of illustration and not of limitation, and the present disclosure is limited only by the claims which follow. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present techniques will be better understood with reference to the following enumerated embodiments:

1. A method comprising: receiving a first user action, at a user interface, requesting a first database development recommendation based on first user selected criteria, wherein the first user selected criteria comprise known static data and expected dynamic data for a first database on a network of disparate computing devices; determining, based on the first user selected criteria, a first parameter for the first database development recommendation; determining, based on the first parameter, a first subset of static and dynamic training data for generating a first feature input, wherein the first subset comprises data streamed in real time from databases accessible to the network; inputting the first feature input into a first machine learning model to generate a first output from the first machine learning model; selecting a first database design element from a plurality of database design elements based on the first output; and generating, at the user interface, the first database development recommendation based on the first database design element.
2. The method of any preceding embodiment, wherein the method is for providing database development recommendations based on multi-modal correlations detected through artificial intelligence.
3. The method of any preceding embodiment, further comprising: after generating the first database development recommendation, receiving a second user action, at the user interface, requesting a second database development recommendation based on second user selected criteria; determining, based on the second user selected criteria, a second parameter for the second database development recommendation; determining, based on the second parameter, a second subset of static and dynamic training data for generating a second feature input; inputting the second feature input into a second machine learning model to generate a second output from the second machine learning model; selecting a second database design element from the plurality of database design elements based on the second output; and generating, at the user interface, the second database development recommendation based on the second database design element.
4. The method of any preceding embodiment, further comprising: determining, based on the first parameter, a first model criterion for the first database development recommendation; selecting the first machine learning model from a plurality of machine learning models based on the first model criterion.
5. The method of any preceding embodiment, further comprising: determining new dynamic data corresponding to an implementation of the first database development recommendation; determining a network location, on the network, comprising the new dynamic data; generating a query for retrieving the new dynamic data; automatically retrieving, based on the query, the new dynamic data from the network location; and generating, at the user interface, the new dynamic data.
6. The method of any preceding embodiment, wherein the known static data comprises a function serviced by the first database and the expected dynamic data comprises expected usage statistics for the first database, and wherein the first parameter is determined based on the function serviced by the first database and the expected usage statistics for the first database.
7. The method of any preceding embodiment, wherein the first parameter comprises a performance characteristic of the first database.
8. The method of any preceding embodiment, wherein determining the first subset of static and dynamic training data for generating the first feature input comprises: filtering available training data based on the known static data to generate a filtered dataset; and retrieving labeled dynamic data corresponding to the filtered dataset.
9. The method of any preceding embodiment, further comprising: querying a metadata retrieval layer; and generating a common function call using the metadata retrieval layer.
10. The method of any preceding embodiment, further comprising: determining a network location, on the network, comprising the labeled dynamic data; generating a query for retrieving the labeled dynamic data; and automatically retrieving, based on the query, the labeled dynamic data from the network location.
11. The method of any preceding embodiment, further comprising: determining an update period for a network location comprising the labeled dynamic data; comparing the update period to a threshold update period; and retrieving the labeled dynamic data in response to the update period corresponding to the threshold update period.
12. A tangible, non-transitory, machine-readable medium storing instructions that, when executed by a data processing apparatus, cause the data processing apparatus to perform operations comprising those of any of embodiments 1-11.
13. A system comprising: one or more processors and memory storing instructions that, when executed by the processors, cause the processors to effectuate operations comprising those of any of embodiments 1-11.
14. A system comprising means for performing any of embodiments 1-11.

What is claimed is:

1. A system for providing database development recommendations, the system comprising:
   cloud-based storage circuitry storing a plurality of machine learning models; and
   cloud-based control circuitry configured to:
      determine, based on a parameter determined using user criteria comprising static data and expected dynamic data for a database on a network of computing devices, a first subset of static and dynamic training data for generating a feature input, wherein the first subset of static and dynamic training data comprises data streamed in real time from databases accessible to the network of computing devices;
      input the feature input into a machine learning model to generate an output;
      select a database design element from a plurality of database design elements based on the output; and
      generate a database development recommendation based on the database design element.

2. A method for providing database development recommendations, the method comprising:
   determining, based on a parameter determined using user criteria comprising static data and expected dynamic data for a database on a network of computing devices, a first subset of static and dynamic training data for generating a feature input, wherein the first subset of static and dynamic training data comprises data streamed in real time from databases accessible to the network of computing devices;
inputting the feature input into a machine learning model to generate an output;
selecting a database design element from a plurality of database design elements based on the output; and
generating a database development recommendation based on the database design element.

3. The method of claim 2, further comprising:
after generating the database development recommendation, receiving a second user action, at a user interface, requesting a second database development recommendation based on second user selected criteria;
determining, based on the second user selected criteria, a second parameter for the second database development recommendation;
determining, based on the second parameter, a second subset of static and dynamic training data for generating a second feature input;
inputting the second feature input into a second machine learning model to generate a second output from the second machine learning model;
selecting a second database design element from the plurality of database design elements based on the second output; and
generating, at the user interface, the second database development recommendation based on the second database design element.

4. The method of claim 2, further comprising:
determining, based on user selected criteria, the parameter for the database development recommendation;
determining, based on the parameter, a model criterion for the database development recommendation; and
selecting a first machine learning model from a plurality of machine learning models based on the model criterion.

5. The method of claim 2, further comprising:
determining new dynamic data corresponding to an implementation of the database development recommendation;
determining a network location, on the network, comprising the new dynamic data;
generating a query for retrieving the new dynamic data;
automatically retrieving, based on the query, the new dynamic data from the network location; and
generating, at a user interface, the new dynamic data.

6. The method of claim 2, further comprising receiving a first user action, at a user interface, requesting the database development recommendation based on user selected criteria, wherein the user selected criteria comprise known static data and the expected dynamic data for the database on the network of disparate computing devices, and wherein the known static data comprises a function serviced by the database and the expected dynamic data comprises expected usage statistics for the database, and wherein the parameter is determined based on the function serviced by the database and the expected usage statistics for the database.

7. The method of claim 2, wherein the parameter comprises a performance characteristic of the database.

8. The method of claim 2, wherein determining the first subset of static and dynamic training data for generating the feature input comprises:
filtering available training data based on known static data to generate a filtered dataset; and
retrieving labeled dynamic data corresponding to the filtered dataset.

9. The method of claim 8, wherein retrieving the labeled dynamic data corresponding to the filtered dataset further comprises:
querying a metadata retrieval layer; and
generating a common function call using the metadata retrieval layer.

10. The method of claim 8, wherein retrieving the labeled dynamic data corresponding to the filtered dataset further comprises:
determining a network location, on the network, comprising the labeled dynamic data;
generating a query for retrieving the labeled dynamic data; and
automatically retrieving, based on the query, the labeled dynamic data from the network location.

11. The method of claim 8, wherein retrieving the labeled dynamic data corresponding to the filtered dataset further comprises:
determining an update period for a network location comprising the labeled dynamic data;
comparing the update period to a threshold update period; and
retrieving the labeled dynamic data in response to the update period corresponding to the threshold update period.

12. One or more non-transitory, computer-readable media comprising instructions that when executed by one or more processors cause operations comprising:
determining, based on a parameter determined using user criteria comprising static data and expected dynamic data for a database on a network of computing devices, a first subset of static and dynamic training data for generating a feature input, wherein the first subset of static and dynamic training data comprises data streamed in real time from databases accessible to the network of computing devices;
inputting the feature input into a machine learning model to generate an output;
selecting a database design element from a plurality of database design elements based on the output; and
generating a database development recommendation based on the database design element.

13. The one or more non-transitory, computer-readable media of claim 12, wherein the instructions further cause operations comprising:
after generating the database development recommendation, receiving a second user action requesting a second database development recommendation based on second user selected criteria;
determining, based on the second user selected criteria, a second parameter for the second database development recommendation;
determining, based on the second parameter, a second subset of static and dynamic training data for generating a second feature input;
inputting the second feature input into a second machine learning model to generate a second output from the second machine learning model;
selecting a second database design element from the plurality of database design elements based on the second output; and
generating, at a user interface, the second database development recommendation based on the second database design element.

14. The one or more non-transitory, computer-readable media of claim 12, wherein the instructions further cause operations comprising:

determining, based on the parameter, a first model criterion for the database development recommendation; and selecting a first machine learning model from a plurality of machine learning models based on the first model criterion.

15. The one or more non-transitory, computer-readable media of claim 12, wherein the instructions further cause operations comprising:
    determining new dynamic data corresponding to an implementation of the database development recommendation;
    determining a network location, on the network, comprising the new dynamic data;
    generating a query for retrieving the new dynamic data;
    automatically retrieving, based on the query, the new dynamic data from the network location; and
    generating, at a user interface, the new dynamic data.

16. The one or more non-transitory, computer-readable media of claim 12, wherein the static data comprises a function serviced by the database and the expected dynamic data comprises expected usage statistics for the database, and wherein the parameter is determined based on the function serviced by the database and the expected usage statistics for the database, and wherein the parameter comprises a performance characteristic of the database.

17. The one or more non-transitory, computer-readable media of claim 12, wherein determining the first subset of static and dynamic training data for generating the feature input comprises:
    filtering available training data based on the static data to generate a filtered dataset; and
    retrieving labeled dynamic data corresponding to the filtered dataset.

18. The one or more non-transitory, computer-readable media of claim 17, wherein retrieving the labeled dynamic data corresponding to the filtered dataset further comprises:
    querying a metadata retrieval layer; and
    generating a common function call using the metadata retrieval layer.

19. The one or more non-transitory, computer-readable media of claim 18, wherein retrieving the labeled dynamic data corresponding to the filtered dataset further comprises:
    determining a network location, on the network, comprising the labeled dynamic data;
    generating a query for retrieving the labeled dynamic data; and
    automatically retrieving, based on the query, the labeled dynamic data from the network location.

20. The one or more non-transitory, computer-readable media of claim 18, wherein retrieving the labeled dynamic data corresponding to the filtered dataset further comprises:
    determining an update period for a network location comprising the labeled dynamic data;
    comparing the update period to a threshold update period; and
    retrieving the labeled dynamic data in response to the update period corresponding to the threshold update period.

\* \* \* \* \*